(12) United States Patent
Fujito et al.

(10) Patent No.: US 12,111,296 B2
(45) Date of Patent: Oct. 8, 2024

(54) ANALYSIS ASSISTANCE DEVICE, ANALYSIS ASSISTANCE METHOD, NON-TRANSITORY COMPUTER READABLE MEDIUM STORING ANALYSIS ASSISTANCE PROGRAM AND ANALYSIS SYSTEM

(71) Applicants: SHIMADZU CORPORATION, Kyoto (JP); MIYAZAKI PREFECTURE, Miyazaki (JP); KYUSHU UNIVERSITY, NATIONAL UNIVERSITY CORPORATION, Fukuoka (JP)

(72) Inventors: Yuka Fujito, Kyoto (JP); Miho Sakai, Miyazaki (JP); Takeshi Bamba, Fukuoka (JP)

(73) Assignees: SHIMADZU CORPORATION, Kyoto (JP); MIYAZAKI PREFECTURE, Miyazaki (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 114 days.

(21) Appl. No.: 17/380,532

(22) Filed: Jul. 20, 2021

(65) Prior Publication Data

US 2022/0026403 A1      Jan. 27, 2022

(30) Foreign Application Priority Data

Jul. 27, 2020   (JP) .................. 2020-126551

(51) Int. Cl.
*G01N 30/32* (2006.01)
*G01N 30/88* (2006.01)
(52) U.S. Cl.
CPC ............. *G01N 30/32* (2013.01); *G01N 30/88* (2013.01); *G01N 2030/324* (2013.01)

(58) Field of Classification Search
None
See application file for complete search history.

(56) References Cited

U.S. PATENT DOCUMENTS 6,289,914 B1    9/2001  Tommasi
2017/0100682 A1    4/2017  Wikfors
(Continued)

FOREIGN PATENT DOCUMENTS

JP     2004-506896 A    3/2004
JP     2010-101875 A    5/2010
(Continued)

OTHER PUBLICATIONS

Miho Sakai et al., Development of a split-flow system for high precision variable sample introduction in supercritical fluid chromatography, Journal of Chromatography A, Jul. 25, 2017, pp. 218-231, vol. 1515, Elsevier B.V.

(Continued)

*Primary Examiner* — Kristina M Deherrera
*Assistant Examiner* — Gedeon M Kidanu
(74) *Attorney, Agent, or Firm* — Paratus Law Group, PLLC

(57) ABSTRACT

A supercritical fluid chromatograph includes a liquid sender that supplies a mobile phase including a supercritical fluid to a supply flow path, first and second back pressure regulators that are respectively provided in first and second flow paths into which a path from the liquid sender branches and an analysis column provided at a position farther upstream than the first back pressure regulator in the first flow path. An analysis assistance device includes a storage a receiver, a first calculator, and a presenter.

8 Claims, 5 Drawing Sheets

(56) References Cited

U.S. PATENT DOCUMENTS

| | | | | |
|---|---|---|---|---|
| 2017/0276652 A1* | 9/2017 | Funada | ................. | G01N 30/32 |
| 2019/0113488 A1* | 4/2019 | Fogwill | ............. | G01N 30/8665 |
| 2019/0285592 A1* | 9/2019 | Yamamoto | ............ | G01N 30/02 |
| 2020/0025725 A1* | 1/2020 | Fujito | ................... | G01N 30/32 |
| 2020/0166485 A1* | 5/2020 | Fujito | ................... | G01N 30/46 |

FOREIGN PATENT DOCUMENTS

| | | | | |
|---|---|---|---|---|
| JP | 2020-085634 A | 6/2020 | | |
| WO | WO 2015/183290 A1 | 12/2015 | | |
| WO | WO-2016031008 A1 * | 3/2016 | ............ | B01D 15/40 |
| WO | WO-2018146826 A1 * | 8/2018 | ............ | G01N 30/22 |

OTHER PUBLICATIONS

Sep. 20, 2023, Japanese Office Action issued for related JP Application No. 2020-126551.

Sakai et al., Development of a split-flow system for high precision variable sample introduction in supercritical fluid chromatography, available at https://www.sciencedirect.com/science/article/pii/S0021967317310981, 2017, pp. 1-12.

* cited by examiner

ANALYSIS ASSISTANCE DEVICE, ANALYSIS ASSISTANCE METHOD, NON-TRANSITORY COMPUTER READABLE MEDIUM STORING ANALYSIS ASSISTANCE PROGRAM AND ANALYSIS SYSTEM

CROSS REFERENCE TO PRIOR APPLICATION

This application claims priority to Japanese Patent Application No. 2020-126551 (filed on Jul. 27, 2020), which is hereby incorporated by reference in its entirety.

BACKGROUND

Technical Field

The present invention relates to an analysis assistance device, an analysis assistance method, a non-transitory computer readable medium storing an analysis assistance program and an analysis system for assisting determination of an analysis condition in a supercritical fluid chromatograph.

Description of Related Art

A supercritical fluid chromatograph (SFC) that uses a supercritical fluid as a mobile phase has been known. In an analysis device described in WO 2016/031008 A1 and Miho Sakai et al., "Development of a split-flow system for high precision variable sample introduction in supercritical fluid chromatography", Journal of Chromatography A, [online], (Holland), Elsevier B. V., Sep. 15, 2017, 1515, pp. 218-231, <http://dx.doi.org/10.1016/j.chroma.2017.07.077>, an analysis column is provided in a first flow path, and a first back pressure regulating valve is provided at a position farther downstream than the analysis column. Further, a second flow path that branches from the first flow path is provided, and a second back pressure regulating valve is provided in the second flow path. Part of a sample and a mobile phase that have been introduced into the supercritical fluid chromatograph is introduced into the analysis column of the first flow path, and a remaining sample and a remaining mobile phase are discharged through the second flow path.

SUMMARY

In the analysis device described in WO 2016/031008 A1, it is possible to adjust the ratio between an amount of a sample to be supplied to the first flow path and an amount of a sample to be discharged from the second flow path (hereinafter referred to as a sample introduction ratio) by adjusting set values of pressure in the first back pressure regulating valve and the second back pressure regulating value. Thus, an amount of a sample to be introduced into the analysis column can be adjusted.

However, it is necessary to repeat trial and error and adjust the set values of pressure in the first back pressure regulating value and the second back pressure regulating vale for each analysis of sample in order to adjust a sample introduction ratio to a desired value. Therefore, it requires experience and time to adjust the sample introduction ratio. Miho Sakai et al., "Development of a split-flow system for high precision variable sample introduction in supercritical fluid chromatography", Journal of Chromatography A, [online], (Holland), Elsevier B. V., Sep. 15, 2017, 1515, pp. 218-231, <http://dx.doi.org/10.1016/j.chroma.2017.07.077> discloses that a flow path of a device, an analysis column and resistance generated due to supply of a makeup liquid also affect a sample introduction ratio in addition to the set values of pressure in the first back pressure regulating valve and the second back pressure regulating valve. However, it still requires experience and time to adjust the sample introduction ratio.

An object of the present invention is to provide an analysis assistance device, an analysis assistance method, a non-transitory computer readable medium storing an analysis assistance program and an analysis system that enable easy adjustment of a sample introduction ratio.

An analysis assistance device according to one aspect of the present invention that assists determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, and includes a storage that stores a relationship between a sample introduction ratio representing a ratio of an amount of a sample to be introduced into the first flow path with respect to an amount of a sample to be introduced into the second flow path, and a differential pressure between the first and second back pressure regulators as a first relationship, a receiver that receives one of a value of the sample introduction ratio and a value of the differential pressure, a first calculator that calculates another value between the sample introduction ratio and the differential pressure from the one received value based on the first relationship, and a presenter that presents the calculated value.

With the analysis assistance device, in a case where a user inputs any value of the sample introduction ratio, a value of the differential pressure between the first and second back pressure regulators for obtaining the input value of the sample introduction ratio is calculated based on the stored first relationship, and the calculated value of the differential pressure is presented. Therefore, the user can easily adjust the sample introduction ratio based on the presented value of the differential pressure. Further, when the user inputs any value of the differential pressure between the first and second back pressure regulators, a value of the sample introduction ratio obtained by the input value of the differential pressure is calculated based on the stored first relationship, and the calculated value of the sample introduction ratio is presented. Therefore, the user can easily adjust the sample introduction ratio by adjusting the value of the differential pressure based on the presented value of the sample introduction ratio.

The analysis assistance device may further include an instructor that instructs the supercritical fluid chromatograph to set a pressure in the first back pressure regulator to a first set value and execute a first operation of supplying a mobile phase to the supply flow path at a first flow rate using the liquid sender with the second back pressure regulator closed, and instructs the supercritical fluid chromatograph to set a pressure in the second back pressure regulator to a second set value and execute a second operation of supplying a mobile phase to the supply flow path at a second flow rate using the liquid sender with the first back pressure regulator closed, an acquirer that acquires a pressure in the supply flow path as a first pressure value during the first operation and acquires a pressure in the supply flow path as a second pressure value during the second operation, a second calculator that calculates a relationship between a pressure applied to the analysis column and a flow rate in the analysis column as a second relationship based on the first flow rate, the first pressure value and the first set value, and calculates a relationship between a pressure applied to the second flow path and a flow rate in the second flow path as a third relationship based on the second flow rate, the second pressure value and the second set value, and a deriver that derives the first relationship based on the second relationship and the third relationship, wherein the storage may store the derived first relationship.

In this case, the second relationship is calculated by execution of the first operation in the supercritical fluid chromatograph, and the third relationship is calculated by execution of the second operation in the supercritical fluid chromatograph. Further, the first relationship is derived based on the second relationship and the third relationship. In this manner, the first relationship is derived automatically. Therefore, it does not take user's time and labor in order to derive the first relationship.

The instructor may instruct the supercritical fluid chromatograph to supply a makeup liquid at a third flow rate to a position farther downstream than the analysis column in the first flow path during the first operation, the acquirer may acquire a pressure that is increased in the supply flow path due to supply of the makeup liquid, the calculator may calculate a relationship between an amount of increase in pressure caused by supply of the makeup liquid and a flow rate of the makeup liquid as a fourth relationship based on the increased pressure and the third flow rate, and the deriver may derive the first relationship based on the second relationship, the third relationship and the fourth relationship.

In this case, the fourth relationship is calculated in a case where the makeup liquid is used, and the first relationship is automatically derived based on the second relationship, the third relationship and the fourth relationship. Therefore, even in a case where the makeup liquid is used, it does not take user's time and labor to derive the first relationship.

An analysis assistance method according to another aspect of the present invention of assisting determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, includes storing a relationship between a sample introduction ratio representing a ratio of an amount of a sample to be introduced into the first flow path with respect to an amount of a sample to be introduced into the second flow path, and a differential pressure between the first and second back pressure regulators as a first relationship, receiving one of a value of the sample introduction ratio and a value of the differential pressure, calculating another value between the sample introduction ratio and the differential pressure from the one received value based on the first relationship, and presenting the calculated value.

With the analysis assistance method, the user can easily adjust the sample introduction ratio based on the presented value of the differential pressure. Further, the user can easily adjust the sample introduction ratio by adjusting the value of the differential pressure based on the presented value of the sample introduction ratio.

The analysis assistance method may further include instructing the supercritical fluid chromatograph to set a pressure in the first back pressure regulator to a first set value and execute a first operation of supplying a mobile phase to the supply flow path at a first flow rate using the liquid sender with the second back pressure regulator closed, and instructing the supercritical fluid chromatograph to set a pressure in the second back pressure regulator to a second set value and execute a second operation of supplying a mobile phase to the supply flow path at a second flow rate using the liquid sender with the first back pressure regulator closed, acquiring a pressure in the supply flow path as a first pressure value during the first operation, acquiring a pressure in the supply flow path as a second pressure value during the second operation, calculating a relationship between a pressure applied to the analysis column and a flow rate in the analysis column as a second relationship based on the first flow rate, the first pressure value and the first set value, calculating a relationship between a pressure applied to the second flow path and a flow rate in the second flow path as a third relationship based on the second flow rate, the second pressure value and the second set value and deriving the first relationship based on the second relationship and the third relationship, wherein the storing may include storing the derived first relationship.

In this case, the first relationship is derived automatically. Therefore, it does not take user's time and labor in order to derive the first relationship.

The analysis assistance method may further include instructing the supercritical fluid chromatograph to supply a makeup liquid at a third flow rate to a position farther downstream than the analysis column in the first flow path during the first operation, acquiring a pressure that is increased in the supply flow path due to supply of the makeup liquid, and calculating a relationship between an amount of increase in pressure caused by supply of the makeup liquid and a flow rate of the makeup liquid as a fourth relationship based on the increased pressure and the third flow rate, and the deriving may include deriving the first relationship based on the second relationship, the third relationship and the fourth relationship.

In this case, even in a case where the makeup liquid is used, the first relationship is derived automatically. Therefore, in a case where the makeup liquid is used, it does not take user's time and labor in order to derive the first relationship.

A non-transitory computer readable medium according to yet another aspect of the present invention stores an analysis assistance program that assists determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, and the analysis assistance program causes a computer to execute the processes of storing a relationship between a sample introduction ratio representing a ratio of an amount of a sample to be introduced into the first flow path with respect to an amount of a sample to be introduced into the second flow path, and a differential pressure between the first and second back pressure regulators as a first relationship, receiving one of a value of the sample introduction ratio and a value of the differential pressure, calculating another value between the sample introduction ratio and the differential pressure from the one received value based on the first relationship, and presenting the calculated value.

With the non-transitory computer readable medium storing the analysis assistance program, the user can easily adjust the sample introduction ratio based on the presented value of the differential pressure. Further, the user can easily adjust the sample introduction ratio by adjusting the value of the differential pressure based on the presented value of the sample introduction ratio.

An analysis system according to yet another aspect of the present invention includes a supercritical fluid chromatograph that includes a liquid supplier that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, and the above-mentioned analysis assistance that assists determination of an analysis condition of the supercritical fluid chromatograph.

With the analysis system, the user can easily adjust the sample introduction ratio based on the presented value of the differential pressure. Further, the user can easily adjust the sample introduction ratio by adjusting the value of the differential pressure based on the presented value of the sample introduction ratio.

DETAILED DESCRIPTION

An analysis assistance device, an analysis assistance method, an analysis assistance program and an analysis system according to embodiments of the present invention will be described below in detail with reference to the drawings.

(1) Configuration of Analysis System

Figure 1:
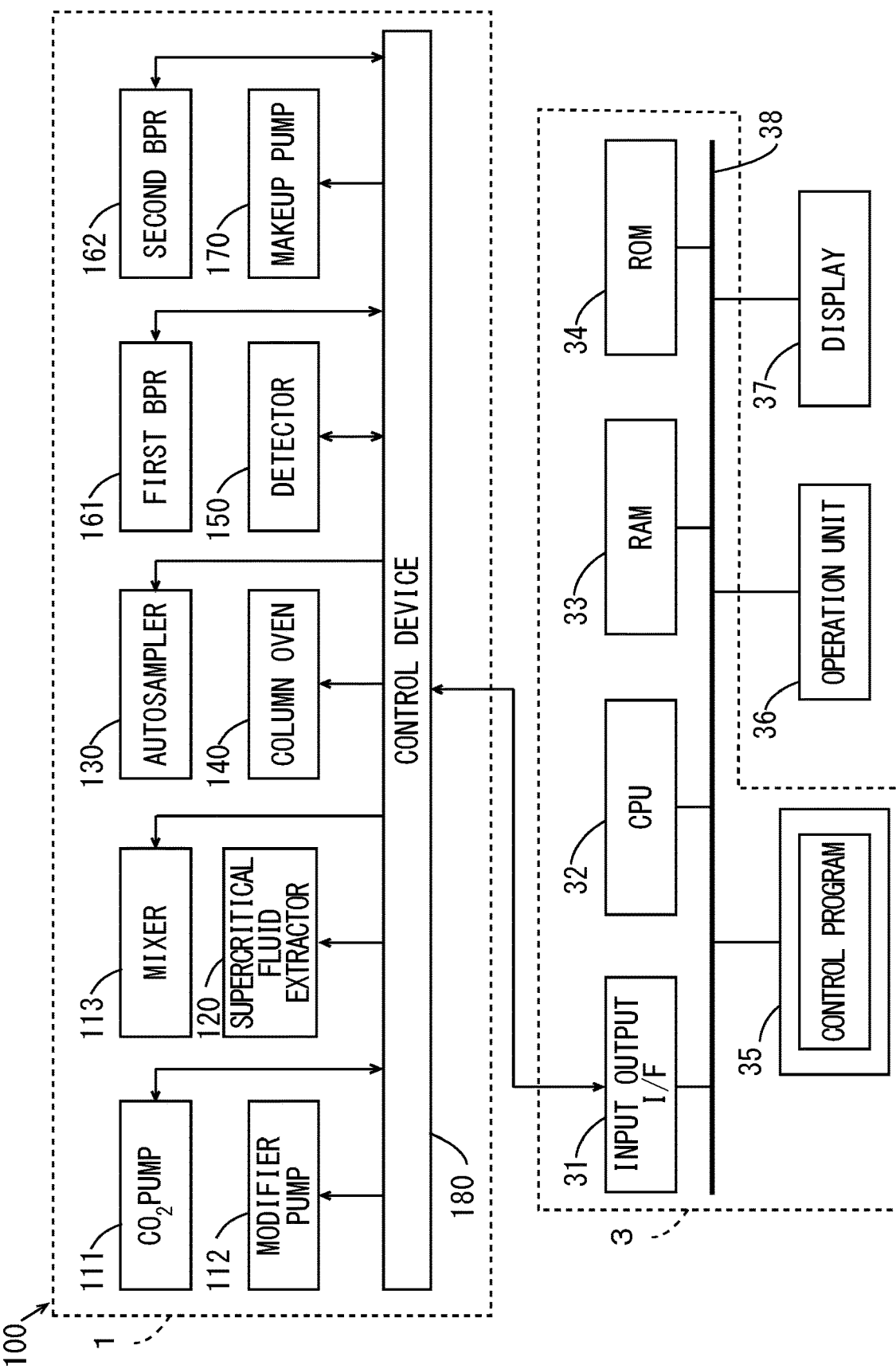
FIG. 1 is a block diagram showing the configuration of an analysis system including an analysis assistance device according to one embodiment of the present invention.
Figure 2:
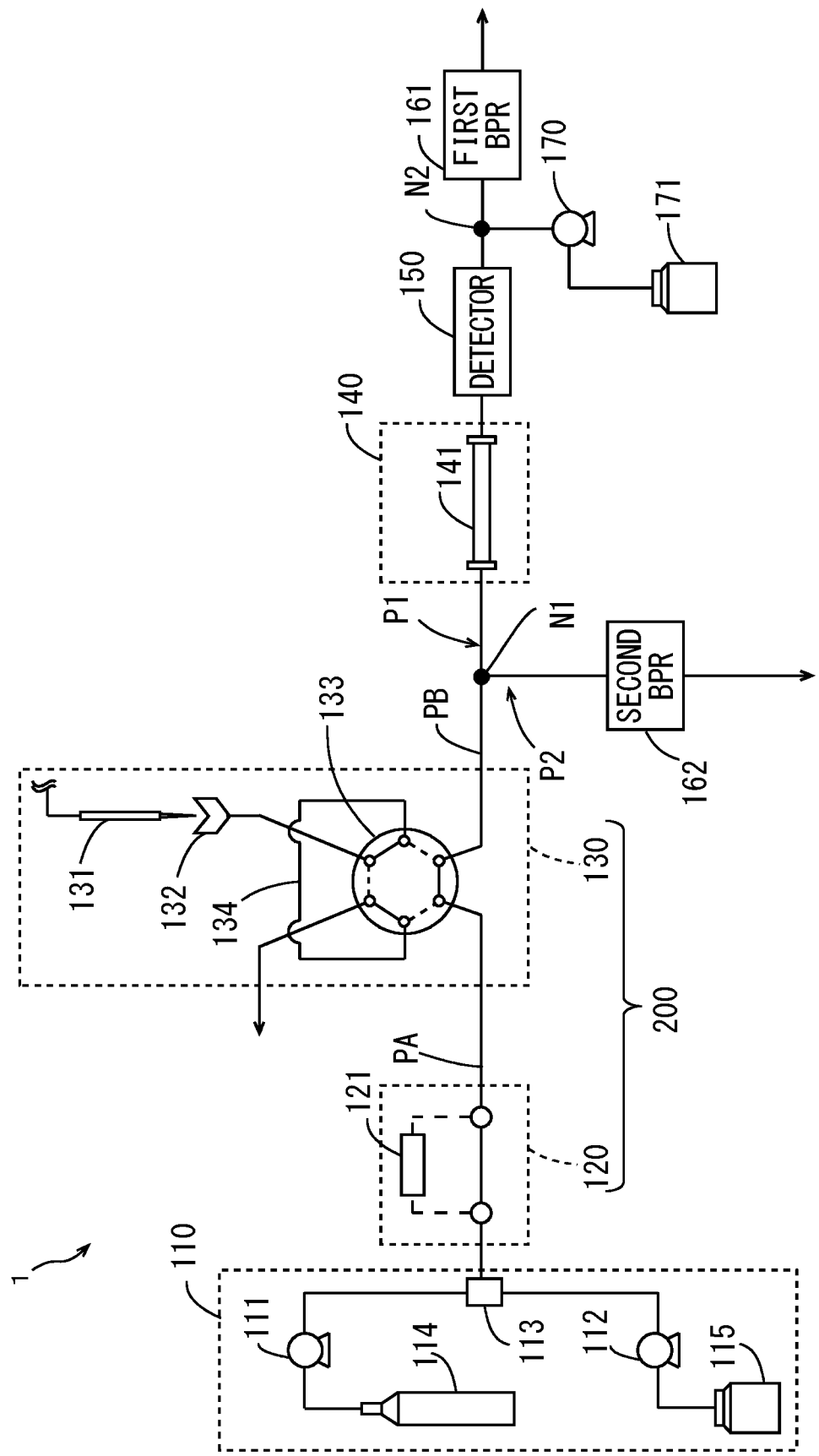
FIG. 2 is a schematic diagram showing the configuration of a supercritical fluid chromatograph included in the analysis system of FIG. 1.

FIG. 1 is a block diagram showing the configuration of an analysis system including the analysis assistance device according to one embodiment of the present invention. FIG. 2 is a schematic diagram showing the configuration of a supercritical fluid chromatograph included in the analysis system of FIG. 1.

The analysis system 100 of FIG. 1 includes the supercritical fluid chromatograph 1 and the analysis assistance device 3. First, the supercritical fluid chromatograph 1 shown in FIG. 2 will be described. In the present embodiment, $CO_2$ (carbon dioxide) is used as a supercritical fluid.

The supercritical fluid chromatograph 1 includes a liquid sender 110, a supercritical fluid extractor 120, an autosampler 130, a column oven 140, a detector 150, a first back pressure regulator (hereinafter referred to as a BPR) 161, a second back pressure regulator (hereinafter referred to as a BPR) 162 and a makeup pump 170. In the present embodiment, the supercritical fluid extractor 120 and the autosampler 130 constitute a sample introducer 200.

The liquid sender 110 includes a $CO_2$ pump 111, a modifier pump 112 and a mixer 113. The $CO_2$ pump 111 extracts $CO_2$ from a cylinder 114 while pressurizing $CO_2$. The $CO_2$ pump 111 has a pressure meter for detecting a discharge pressure and a monitor for displaying a pressure value. The modifier pump 112 extracts a modifier, which is a polar solvent, from a modifier container 115. As the modifier, methanol or ethanol is used, for example.

The mixer 113 mixes the $CO_2$ extracted by the $CO_2$ pump 111 with the modifier extracted by the modifier pump 112, and supplies a liquid mixture to a supply flow path PA as a mobile phase. In the present embodiment, the mixer 113 is a gradient mixer that mixes $CO_2$ with the modifier at a set ratio.

The supply flow path PA is provided with the supercritical fluid extractor 120. The supercritical fluid extractor 120 includes an extraction container 121 that contains a sample. During the analysis of the sample, the supercritical fluid extractor 120 extracts a component to be analyzed from the sample as a sample component using a supercritical fluid ($CO_2$ in the present embodiment) included in the mobile phase. The extracted sample component and the mobile phase are supplied to the supply flow path PA.

The autosampler 130 includes a needle 131, an injection port 132, a switching valve 133 and a sample loop 134. The needle 131 sucks a standard sample and discharges the standard sample to the injection port 132. The sample loop 134 temporarily retains the standard sample that has been injected into the injection port 132. The supply flow path PA, the supply flow path PB, the injection port 132 and the sample loop 134 are connected to the switching valve 133. The switching valve 133 can switch between a first state and a second state, the first state being the state where the supply flow path PA is connected to the supply flow path PB and the injection port 132 is connected to the sample loop 134, and the second state being the state where the supply flow path PA, the sample loop 134 and the supply flow path PB are connected to one another. That is, the first state is a mode in which components extracted in the supercritical fluid extractor 120 pass through the supply flow path PB to be analyzed in the analysis column and is a supercritical fluid extraction-supercritical fluid chromatography mode (hereinafter referred to as an SFE-SFC mode). The second state is a mode in which a sample that has been injected from the autosampler 130 passes through the sample loop 134 and the supply flow path PB to be analyzed in the analysis column 141 and is a supercritical fluid chromatography mode (hereinafter referred to as an SFC mode).

The supply flow path PB branches into a first flow path P1 and a second flow path P2 at a branch portion N1. The column oven 140 contains the analysis column 141 and keeps the temperature in the analysis column 141 at a set temperature. In the first flow path P1, the analysis column 141, the detector 150 and the first BPR 161 are provided in order. The sample component and the mobile phase are introduced into the analysis column 141. The analysis column 141 separates a sample component into further specific components. The separated components are detected by the detector 150. The detector 150 is an ultraviolet detector, for example. A mass spectrometry device (not shown) may be connected to a position farther downstream than the first BPR 161 of FIG. 2.

The first BPR 161 operates to keep a suction pressure (a pressure at a position farther downstream than the detector 150 in the present embodiment) at a set value. A pressure at a position farther downstream than the first BPR 161 is an air pressure. The makeup pump 170 extracts a makeup liquid from the makeup container 171 and supplies the makeup liquid to a junction N2 with the first flow path P1. A solvent that is compatible with a supercritical carbon dioxide such as methanol is used as a makeup liquid. In a case where a mass spectrometer is used as a detector, an ionization promoter such as formic acid or ammonia formate may be included in a makeup liquid. In a case where a mass spectrometer is not used, a makeup liquid is responsible for maintaining a pressure in the BPR 161 and adjusting a split ratio when the flow rate is low.

The second flow path P2 is provided with the second BPR 162. The second BPR 162 operates to keep a suction pressure (the pressure in the second flow path P2 in the present embodiment) at a set value.

The set value of the pressure in the first BPR 161 and the set value of the pressure in the second BPR 162 are adjusted, whereby $CO_2$ in the supply flow paths PA, PB, the first flow path P1 and the second flow path P2 is put into a supercritical state. Further, the set value of the pressure in the first BPR 161 and the set value of the pressure in the second BPR 162 are adjusted, whereby the ratio (hereinafter referred to as a sample introduction ratio) of a flow rate of a sample to be introduced into the first flow path P1 to a flow rate of a sample to be introduced into the second flow path P2 is changed. A sample introduction ratio is equivalent to a ratio of a flow rate of a mobile phase to be supplied to the first flow path P1 to a flow rate of a mobile phase to be supplied to the second flow path P2. A sample introduction ratio is also referred to as a split ratio. For example, in a case where a sample is to be analyzed in the supercritical fluid extraction-supercritical chromatography mode (SFE-SFC mode), it is preferable that an amount of sample to be introduced into the supercritical fluid extractor 120 is large in order to extract a larger amount of a component to be analyzed in a sample. On the other hand, a large amount of an impurity component is also included in an extraction liquid extracted in the supercritical fluid extractor 120 in addition to a component to be analyzed. Therefore, it may be preferable that an amount of a sample to be introduced into the analysis column 141 is relatively small in order to enhance detection accuracy of the component to be analyzed in the analysis column 141. In such a case, it is possible to adjust an amount of sample to be introduced into each of the supercritical fluid extractor 120 and the analysis column 141 to a suitable value by adjusting a sample introduction ratio.

As shown in FIG. 1, the supercritical fluid chromatograph 1 includes a control device 180. The control device 180 controls the $CO_2$ pump 111, the modifier pump 112, the mixer 113, the supercritical fluid extractor 120 and the autosampler 130. Further, the control device 180 controls the column oven 140, the first BPR 161, the second BPR 162, the detector 150 and the makeup pump 170. Further, the control device 180 acquires a pressure value from the pressure meter of the $CO_2$ pump 111.

As shown in FIG. 1, the analysis assistance device 3 includes an input output I/F (interface) 31, a CPU (Central Processing Unit) 32, a RAM (Random Access Memory), a ROM (Read Only Memory) 34 and a storage device 35 and is constituted by a personal computer or a server, for example. The input output I/F 31, the CPU 32, the RAM 33, the ROM 34 and the storage device 35 are connected to a bus 38. An operation unit 36 and a display 37 are connected to the bus 38 of the analysis assistance device 3. The operation unit 36 includes a keyboard, a pointing device and so on, and is used to input various values, etc. and perform various operations. The display 37 includes a liquid crystal display, an organic electroluminance display or the like and displays various information and images. The operation unit 36 and the display 37 may be constituted by a touch panel display.

The storage device 35 includes a storage medium such as a hard disc, an optical disc, a magnetic disc, a semiconductor memory or a memory card, and stores the analysis assistance program. The RAM 33 is used as a work area for the CPU 32. A system program is stored in the ROM 34. The CPU 32 executes the analysis assistance program stored in the storage device 35 on the RAM 33, whereby the below-mentioned analysis assistance method is performed.

(2) Method of Calculating Sample Introduction Ratio

A sample introduction ratio is calculated by the following method based on a set value of the pressure in the first BPR 161 and a set value of the pressure in the second BPR 162. As a condition for an analysis of sample component, a type of the analysis column 141 (an inner diameter of the analysis column, a length of the analysis column and a filler), a concentration of modifier (a ratio of a flow rate of the modifier with respect to a total flow rate of $CO_2$ and the modifier), a temperature in the analysis column 141 and so on are prescribed in an analysis method. The supply flow path PA and the supply flow path PB are connected to each other through the switching valve 133.

First, the pressure in the first flow path P1 will be studied. Here, a pressure in an upstream portion of the analysis column 141 in the first flow path P1 is referred to as a column-side pressure ΔPcolumn-side. In a case where it is assumed that the second flow path P2 is not present, the column-side pressure ΔPcolumn-side is expressed by the following expression.

$$\Delta P\text{column-side} = P[BPR1] + \Delta P\text{column} + \Delta P\text{make-}up \quad (1)$$

In the above-mentioned expression (1), P[BPR1] is a set value of the pressure in the first BPR 161. ΔPcolumn is a pressure drop caused by the analysis column 141 (hereinafter referred to as a column pressure). ΔPmake-up is a pressure to be applied to the junction N2 by the makeup pump 170 (hereinafter referred to as a makeup pressure).

A set value P[BPR1] is known. With the second BPR 162 closed, a column pressure ΔPcolumn and a makeup pressure ΔPmake-up are calculated as described below. A column pressure ΔPcolumn depends on a type of the analysis column 141, a concentration of a modifier and a temperature in the analysis column 141 and changes linearly with respect to a flow rate of a mobile phase in the analysis column 141. The effect of a set value of the pressure in the first BPR 161 on a column pressure ΔPcolumn is small. A type of the analysis column 141, a value of concentration of a modifier and a value of temperature in the analysis column 141 are prescribed in advance in the analysis method. A concentration of a modifier of a mobile phase is set by the mixer 113 to a value that is prescribed in advance.

With the makeup pump 170 not working (with a makeup liquid not supplied to the junction N2), a mobile phase is supplied to the first flow path P1 at a first flow rate through the supply flow paths PA, PB from the liquid sender 110. In the present embodiment, the first flow rate is set to a typical flow rate (2 mL/min, for example). A pressure value is acquired from the pressure meter of the $CO_2$ pump 111 in this state. An acquired pressure value is a pressure value in an upstream portion of the analysis column 141 in the first flow path P1. At this time, because a pressure value in a downstream portion of the analysis column 141 is a set value P[BPR1], a column pressure $\Delta$Pcolumn is calculated by subtraction of the set value P[BPR1] from the acquired pressure value. Letting a flow rate of a mobile phase in the analysis column 141 be a column flow rate Fc, a relational expression between a column pressure $\Delta$Pcolumn and the column flow rate Fc is obtained by proportional calculation.

$$\Delta P\text{column} = Ka \cdot Fc \quad (A)$$

Ka is a coefficient in the relational expression (A). With the relational expression (A), a value of the column pressure $\Delta$Pcolumn with respect to any value of the column flow rate Fc can be calculated.

Thereafter, a makeup liquid is supplied to the junction N2 at a third flow rate by the makeup pump 170. In the present embodiment, the third flow rate is set to a typical flow rate (0.5 mL/min, for example). Thus, a pressure value acquired from the pressure meter of the $CO_2$ pump increases. An amount of increase in pressure value caused by supply of the makeup liquid is equivalent to a difference between a pressure value acquired from the pressure meter of the $CO_2$ pump 111 when the flow rate of the makeup liquid is 0 and a pressure value acquired from the pressure meter of the $CO_2$ pump 111 when the flow rate of the makeup liquid is the third flow rate. In a case where the composition of the makeup liquid is constant, a makeup pressure $\Delta$Pmake-up is proportional to a flow rate of the makeup liquid. Therefore, letting a flow rate of a makeup liquid be Fm, the following relational expression is obtained from an amount of increase in pressure value caused by supply of the makeup liquid and the third flow rate.

$$\Delta P\text{make-}up = Km \cdot Fm \quad (C)$$

With the relational expression (C), a value of the makeup pressure $\Delta$Pmake-up with respect to any flow rate of a makeup liquid can be calculated.

From the above, a column-side pressure $\Delta$Pcolumn-side is automatically calculated by the above-mentioned expression (1) with use of a set value P[BPR1] of the pressure in the first BPR 161, a column pressure $\Delta$Pcolumn under an actual analysis condition and $\Delta$Pmake-up under the actual analysis condition.

Next, the pressure in the second flow path P2 will be studied. Here, a pressure in an upstream portion of the second BPR 162 in the second flow path P2 is referred to as a vent-side pressure $\Delta$Pvent-side. In a case it is assumed that the first flow path P1 is not present, a vent-side pressure $\Delta$Pvent-side is expressed by the following expression.

$$\Delta P\text{vent-side} = P[BPR2] + \Delta P\text{vent-system} \quad (2)$$

In the above-mentioned expression (2), P[BPR2] is a set value of the pressure in the second BPR 162. $\Delta$Pvent-system is a pressure drop of a system such as a pipe of the second flow path P2 (hereinafter referred to as a vent-system pressure).

A set value P[BPR2] is known. With the first BPR 161 closed, a vent-system pressure $\Delta$Pvent-system is calculated as described below. A vent-system pressure $\Delta$Pvent-system depends on a concentration of a modifier and changes linearly with respect to a flow rate of a mobile phase in the second flow path P2. As described above, a value of the concentration of a modifier is prescribed in advance in the analysis method. A concentration of a modifier of a mobile phase is set by the mixer 113 to a value that is prescribed in advance.

A mobile phase is supplied to the second flow path P2 at a second flow rate through the supply flow paths PA, PB from the liquid sender 110. In the present embodiment, the second flow rate is set to a typical flow rate (2 mL/min, for example). A pressure value is acquired from the pressure meter of the $CO_2$ pump 111 in this state. An acquired pressure value is a pressure value of a portion near the branch portion N1 in the second flow path P2. At this time, because a pressure value in the upstream portion of the second BPR 162 is a set value P[BPR2] of the pressure in the second BPR 162, a vent-system pressure Pvent-system is calculated by subtraction of the set value P[BPR2] from the acquired pressure value. Letting a flow rate of a mobile phase in the second flow path P2 be a vent-system flow rate Fvent, a relational expression between a vent-system pressure $\Delta$Pvent-system and the vent-system pressure Fvent is obtained by proportional calculation.

$$\Delta P\text{vent-system} = Kb \cdot F\text{vent} \quad (B)$$

In the relational expression (B), Kb is a coefficient. With the relational expression (B), a value of the vent-system pressure $\Delta$Pvent-system with respect to any value of the vent-system flow rate Fvent can be calculated.

From the above, a vent-side pressure Pvent-side is automatically calculated by the above-mentioned expression (2) with use of a set value P[BPR2] of the pressure in the second BPR 162 and a vent-system pressure Pvent-system under an actual analysis condition.

In the supercritical fluid chromatograph 1 of FIG. 2, because the first flow path P1 and the second flow path P2 are connected by the branch portion N1, a column-side pressure $\Delta$Pcolumn-side and a vent-side pressure $\Delta$Pvent-side are equal to each other. Thus, the following expression holds.

$$\Delta P\text{column-side} = \Delta P\text{vent-side} \quad (3)$$

The following expression holds by the above-mentioned expressions (1), (2) and (3).

$$P[BPR1] + \Delta P\text{column} + \Delta P\text{make-}up = P[BPR2] + \Delta P\text{vent-system} \quad (4)$$

In a case where the above-mentioned expression (4) is modified, the following expression holds.

$$\Delta P\text{column} - \Delta P\text{vent-system} = P[BPR2] - P[BPR1] - \Delta P\text{make-}up \quad (5)$$

In the above-mentioned expression (5), P[BPR2] and P[BPR1] are set values, and $\Delta$Pmake-up is a fixed value. Therefore, the right part of the above-mentioned expression is a determined value. Further, the following expression holds by the above-mentioned expression (5) and the relational expressions (A) and (B).

$$Ka \cdot Fc - Kb \cdot F\text{vent} = P[BPR2] - P[BPR1] - \Delta P\text{make-}up \quad (6)$$

Here, letting a total flow rate of a mobile phase to be supplied to the branch portion N1 from the liquid sender 110 be Ft, Fvent=Ft−Fc. Thus, the following expression holds.

$$(Ka + Kb) \cdot Fc - Kb \cdot Ft = P[BPR2] - P[BPR1] - \Delta P\text{make-}up \quad (7)$$

In the above-mentioned expression, the total flow rate Ft of a mobile phase is a set value, and the coefficient Ka and the coefficient Kb are respectively determined in advance. The next relational expression holds by the above-mentioned expression (7).

$$Fc = (Kb \cdot Ft + P[BPR2] - P[BPR1] - \Delta P\text{make-}up) / (Ka + Kb) \quad (8)$$

The column flow rate Fc is calculated by the above-mentioned expression (8). Further, a vent-system flow rate Fvent is Ft−Fc. A flow rate of a sample to be introduced into the analysis column 141 is equivalent to a column flow rate Fc in the analysis column 141, and a flow rate of a sample in the second flow path P2 is equivalent to a vent-system flow rate Fvent (=Ft−Fc). Thus, a sample introduction ratio R is calculated by the following relational expression.

$$R=Fc/(Ft-Fc) \quad (9)$$

Here, a difference between a set value P[BPR2] of the pressure in the second BPR 162 and a set value P[BPR1] of the pressure in the first BPR161 is referred to as a differential pressure (P[BPR2]−P[BPR1]).

As described above, in a case where a set value P[BPR1] of the pressure in the first BPR16 and a set value P[BPR2] of the pressure in the second BPR162 are determined, a value of the difference pressure (P[BPR2]−P[BPR1]) between the first and second BPRs 161, 162 is determined, and a sample introduction ratio R can be calculated by the relational expressions (8) and (9) based on a value of the difference pressure (P[BPR2]−P[BPR1]). Further, in a case where a value of the differential pressure (P[BPR2]−P[BPR1]) between the first and second BPRs 161, 162 is determined, a value of the sample introduction ratio R corresponding to the value of the differential pressure (P[BPR2]−P[BPR1]) can be calculated by the relational expressions (8) and (9). Further, a value of the differential pressure (P[BPR2]−P[BPR1]) between the first and second BPRs 161, 162 for obtaining a value of the intended sample introduction ratio R can be determined by the relational expressions (8) and (9).

(3) Functional Configuration of Analysis Assistance Device 3

Figure 3:
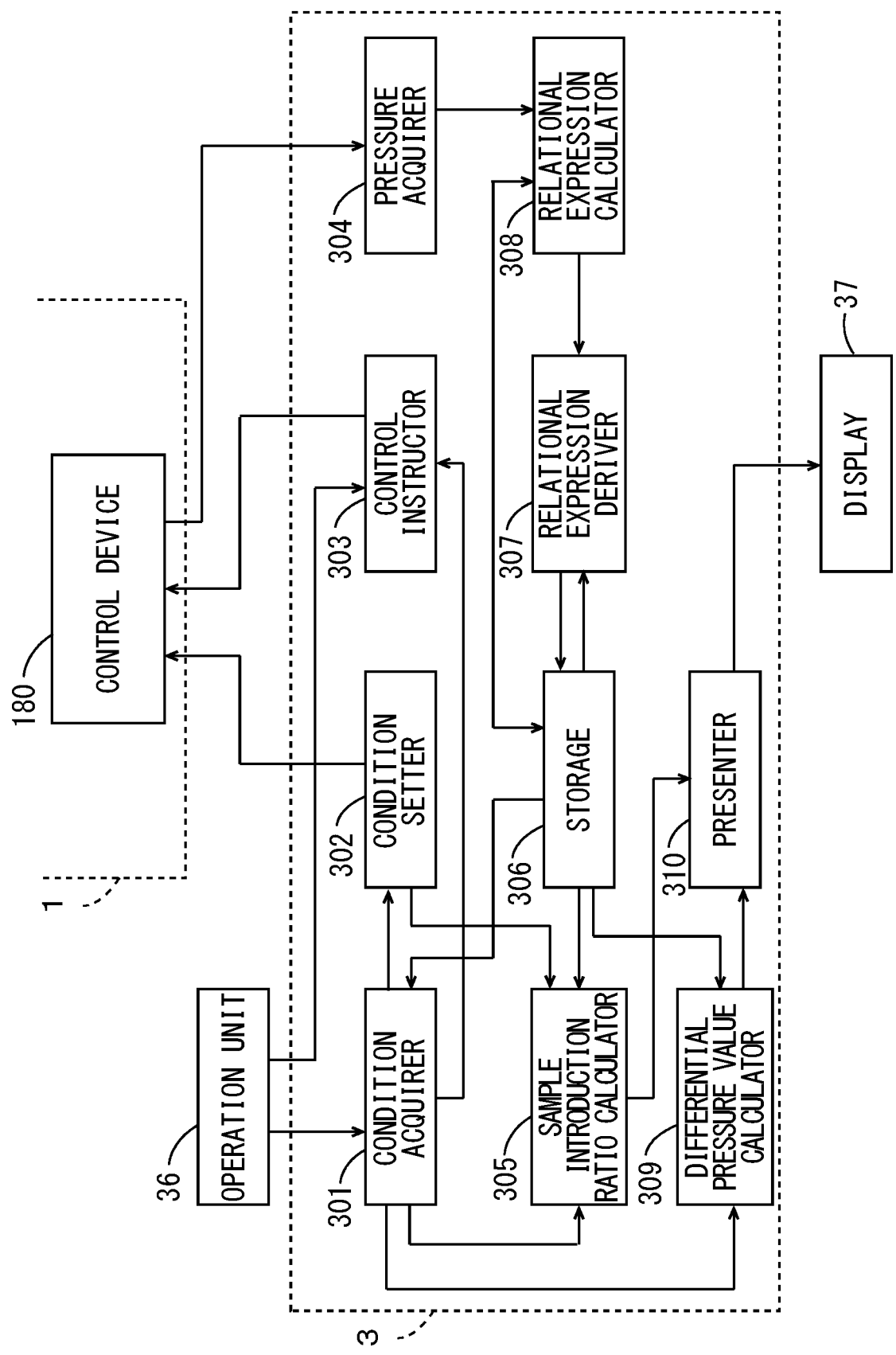
FIG. 3 is a block diagram showing the functional configuration of the analysis assistance device of FIG. 1.

FIG. 3 is a block diagram showing the functional configuration of the analysis assistance device 3 of FIG. 1. As shown in FIG. 3, the analysis assistance device 3 includes a condition acquirer 301, a condition setter 302, a control instructor 303, a pressure acquirer 304, a sample introduction ratio calculator 205, a storage 306, a relational expression deriver 307, a relational expression calculator 308, a differential pressure value calculator 309 and a presenter 310. The functions of the above-mentioned constituent elements (301 to 310) are implemented by execution of the analysis assistance program which is a computer program stored in a storage medium (recording medium) such as the storage device 35 by the CPU 32 of FIG. 1. Part or all of the constituent elements of the analysis assistance device 3 may be realized by hardware such as an electronic circuit.

One or a plurality of analysis methods are stored in the storage 306. The condition acquirer 301 acquires an analysis condition such as various set values input by the user using the operation unit 36 or an analysis condition prescribed by the analysis method stored in the storage 306. The condition setter 302 performs settings of each component of the supercritical fluid chromatograph 1 via the control device 180 of the supercritical fluid chromatograph 1 based on the analysis condition acquired by the condition acquirer 301 or an instruction input by the operation unit 36. The control instructor 303 instructs the control device 180 to control each component of the supercritical fluid chromatograph 1 based on various instructions input by the user using the operation unit 36 or the analysis condition acquired by the condition acquirer 301.

The pressure acquirer 304 acquires a pressure value of the pressure meter of the $CO_2$ pump 111 through the control device 180. The relational expression calculator 308 calculates the above-mentioned relational expressions (A), (B) and (C) based on an analysis condition prescribed by the analysis method stored in the storage 306 and the pressure value acquired by the pressure acquirer 304. The calculated relational expressions (A), (B) and (C) are stored in the storage 306. The relational expression deriver 307 derives the relational expressions (8) and (9) based on the relational expressions (A), (B) and (C) calculated by the relational expression calculator 308. The derived relational expressions (8) and (9) are stored in the storage 306.

A sample introduction ratio calculator 305 calculates a value of the sample introduction ratio R based on a value of the differential pressure (P[BPR2]−P[BPR1]) acquired by the condition acquirer 301 and the relational expressions (8) and (9) stored in the storage 306. The differential pressure value calculator 309 calculates a value of the differential pressure (P[BPR2]−P[BPR1]) based on a value of the sample introduction ratio R acquired by the condition acquirer 301 and the relational expressions (8) and (9) stored in the storage 306. The presenter 310 presents the value of the sample introduction ratio R calculated by the sample introduction ratio calculator 305 or the value of the differential pressure (P[BPR2]−P[BPR1]) calculated by the differential pressure value calculator 309 using the display 37. The presenter 310 may present the value of the sample introduction ratio R or the value of the differential pressure (P[BPR2]−P[BPR1]) to the user using another method such as a sound.

(4) Analysis Assistance Program

Figure 4:
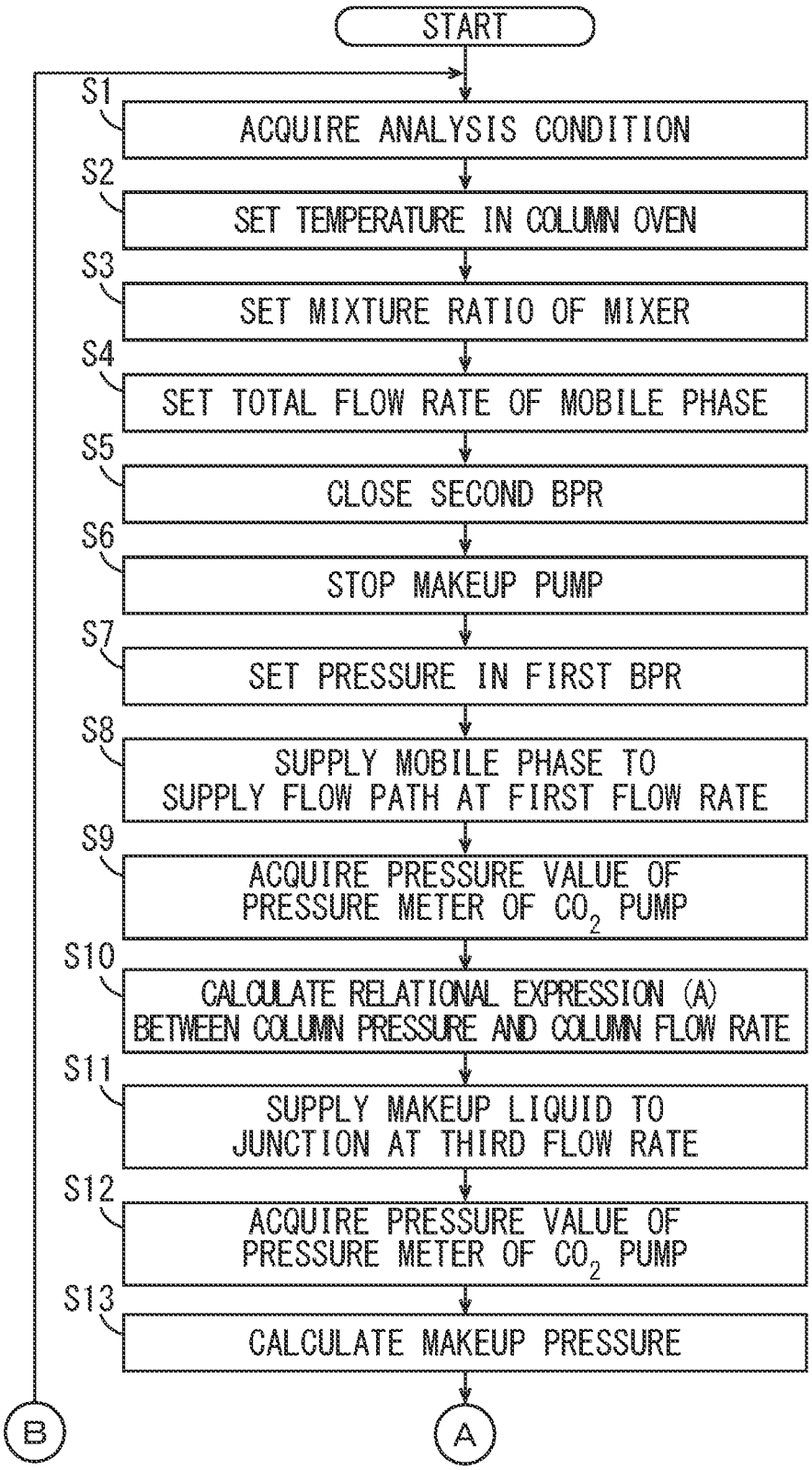
FIG. 4 is a flow chart showing the algorithm of an analysis assistance program.
Figure 5:
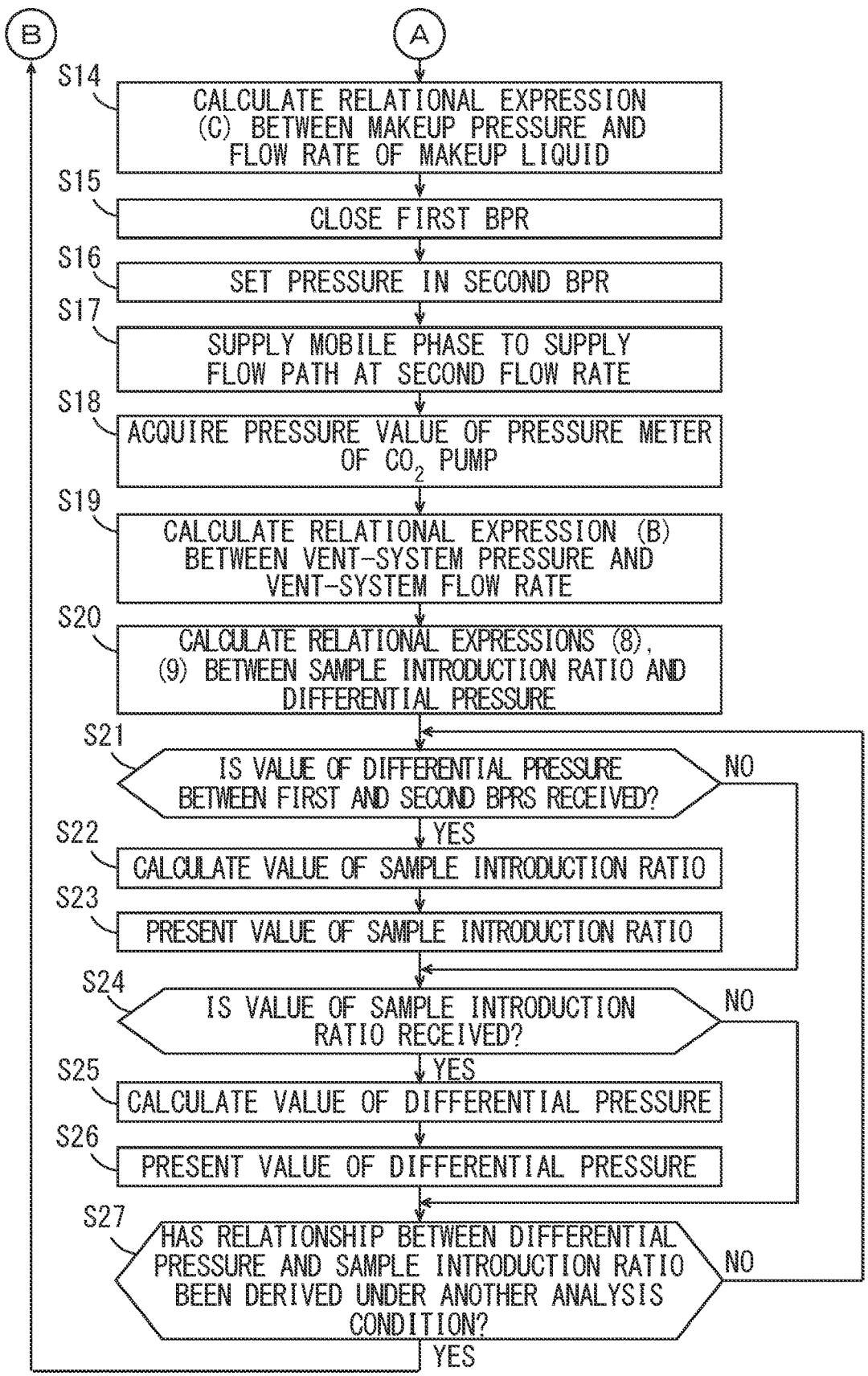
FIG. 5 is a flow chart showing the algorithm of the analysis assistance program.

FIGS. 4 and 5 are flow charts showing the algorithm of the analysis assistance program. The algorithm of the analysis assistance program will be described with reference to FIGS. 4 and 5. The analysis assistance method is performed by execution of the analysis assistance program.

First, the condition acquirer 301 acquires an analysis condition from an analysis method stored in the storage 306 (step S1). An analysis condition includes a temperature of the analysis column 141, a concentration of a modifier, a total flow rate of a mobile phase, a set value of the pressure in the first BPR 161, a set value of the pressure in the second BPR 162, a flow rate of a makeup liquid and so on. The condition acquirer 301 may acquire part or all of analysis conditions from the operation unit 36 operated by the user.

Next, the condition setter 302 sets a temperature of the column oven 140 via the control device 180 based on the analysis condition acquired by the condition acquirer 301 (step S2). Further, the condition setter 302 sets a mixture ratio of the mixer 113 via the control device 180 based on the analysis condition acquired by the condition acquirer 301 (step S3). Further, the condition setter 302 sets the total flow rate of the mobile phase in the liquid sender 110 via the control device 180 based on the analysis condition acquired by the condition acquirer 301 (step S4).

Next, the control instructor 303 instructs the control device 180 to close the second BPR 162 of the supercritical fluid chromatograph 1 (step S5). Further, the control instructor 303 instructs the control device 180 to stop the makeup pump 170 (step S6). Next, the condition setter 302 sets a pressure in the first BPR 161 to a first set value via the control instructor 303 (step S7).

Thereafter, the control instructor 303 instructs the control device 180 to supply a mobile phase to the supply flow paths PA, PB at the first flow rate (step S8). Thus, the mobile phase is supplied to the first flow path P1 through the supply flow paths PA, PB by the liquid sender 110 at the first flow rate. In this state, the pressure acquirer 304 acquires a pressure value of the pressure meter of the $CO_2$ pump 111 through the control device 180 (step S9). The relational expression calculator 308 calculates the relational expression (A) between a column pressure ΔPcolumn and a column flow rate Fc based on the flow rate of the mobile phase and the pressure value acquired by the pressure acquirer 304 (step S10).

Thereafter, the control instructor 303 instructs the control device 180 to supply a makeup liquid to the junction N2 at the third flow rate by the makeup pump 170 (step S11). In this state, the pressure acquirer 304 acquires a pressure value of the pressure meter of the $CO_2$ pump 111 through the control device 180 (step S12). The relational expression calculator 308 calculates a makeup pressure ΔPmake-up based on the acquired pressure value (step S13). Further, the relational expression calculator 308 calculates the relational expression (C) between the calculated makeup pressure ΔPmake-up and a flow rate Fm of a makeup liquid (step S14).

Next, the control instructor 303 instructs the control device 180 to close the first BPR 161 (step S15). The condition setter 302 sets a pressure in the second BPR 162 to a second set value via the control instructor 303 (step S16). The control instructor 303 instructs the control device 180 to supply the mobile phase to the supply flow paths PA, PB at the second flow rate (step S17). Thus, the mobile phase is supplied to the second flow path P2 through the supply flow paths PA, PB at the second flow rate by the liquid sender 110. In this state, the pressure acquirer 304 acquires a pressure value of the pressure meter of the $CO_2$ pump 111 through the control device 180 (step S18). The relational expression calculator 308 calculates the relational expression (B) between a vent-system pressure ΔPvent-system and a vent-system flow rate Fvent based on the flow rate of the mobile phase and the pressure value acquired by the pressure acquirer 304 (step S19).

The relational expression deriver 307 derives the relational expressions (8) and (9) between the sample introduction ratio R and the differential pressure (P[BPR2]−P[BPR1]) between the first and second BPRs 161, 162 (step S20). The relational expressions (8) and (9) between the sample introduction ratio R and the differential pressure (P[BPR2]−P[BPR1]) is stored in the storage 306. In this case, the presenter 310 may present the relational expressions (8) and (9) between the differential pressure between the first and second BPRs 161, 162, and the sample introduction ratio.

The user can input any value of the differential pressure (P[BPR2]−P[BPR1]) between the first and second BPRs 161, 162 using the operation unit 36. The condition acquirer 301 determines whether the value of the differential pressure (P[BPR2]−P[BPR1]) between the first and second BPRs 161, 162 has been received from the operation unit 36 (step S21). In a case where a set value P[BPR1] of the pressure in the first BPR 162 is set, the condition acquirer 301 can receive a value of the differential pressure (P[BPR2]−P[BPR1]) by input of a set value P[BPR2] of the pressure in the second BPR 162 by the user. Further, in a case where a set value P[BPR2] of the pressure in the second BPR 162 is set, the condition acquirer 301 can receive a value of the differential pressure (P[BPR2]−P[BPR1]) by input of the set value P[BPR1] of the pressure in the first BPR 161 by the user.

In a case where the value of the differential pressure (P[BPR2]−P[BPR1]) has been received, the sample introduction ratio calculator 305 calculates a value of the sample introduction ratio R corresponding to the value of the differential pressure (P[BPR2]−P[BPR1]) based on the relational expressions (8) and (9) (step S22). The presenter 310 presents the calculated value of the sample introduction ratio R to the user using the display 37 (step S23). In a case where the value of the differential pressure (P[BPR2]−P[BPR1]) has not been received in the step S21, the condition acquirer 301 proceeds to the step S24.

The user can input any value of the sample introduction ratio R using the operation unit 36. The condition acquirer 301 determines whether the value of the sample introduction ratio R has been received (step S24). In a case where the value of the sample introduction ratio R has been received by the condition acquirer 301, the differential pressure value calculator 309 calculates the value of the differential pressure (P[BPR2]−P[BPR1]) corresponding to the value of the sample introduction ratio R based on the relational expressions (8) and (9) (step S25). The presenter 310 presents the value of the calculated differential pressure (P[BPR2]−P[BPR1]) to the user using the display 37 (step S26). In a case where the value of the sample introduction ratio R has not been received in the step S24, the condition acquirer 301 proceeds to the step S27.

The condition acquirer 301 determines whether an instruction for deriving the relationship between the sample introduction ratio R and the differential pressure (P[BPR2]−P[BPR1]) under another analysis condition has been provided by the operation unit 36 (step S27). In a case where the instruction for deriving the relationship between the sample introduction ratio R and the differential pressure (P[BPR2]−P[BPR1]) under another analysis condition has not been provided, the condition acquirer 301 returns to the step S21 and repeats the process of the steps S21 to S26. In a case where the instruction for deriving the relationship between the sample introduction ratio R and the differential pressure (P[BPR2]−P[BPR1]) under another analysis condition has been provided, the condition acquirer 301 returns to the step S1 and repeats the process of the steps S1 to S26.

The process of the steps S5 to S14 is a first operation, and the steps S15 to S19 are a second operation.

(5) Effects of Embodiments

With the present embodiment, in a case where the user inputs any value of a sample introduction ratio R, a value of the differential pressure (P[BPR2]−P[BPR1]) corresponding to the input value of the sample introduction ratio R is presented based on the stored relational expressions (8) and (9). Therefore, the user can easily adjust the sample introduction ratio R based on the presented value (P[BPR2]−P[BPR1]). Further, in a case where the user inputs any value of the differential pressure (P[BPR2]−P[BPR1]) between the first and second BPRs 161, 162, a value of the sample introduction ratio R corresponding to the input value of the differential pressure (P[BPR2]−P[BPR1]) is calculated based on the stored relational expressions (8) and (9), and the calculated value of the sample introduction ratio R is presented. Therefore, the user can easily adjust the sample introduction ratio R by adjusting the value of the differential pressure (P[BPR2]−P[BPR1]) based on the presented value of the sample introduction ratio R. In this case, the user can adjust the value of the differential pressure (P[BPR2]−P[BPR1]) by adjusting at least one of the set values P[BPR1], P[BPR2] of the pressures in the first and second BPRs 161, 162.

Further, the relational expressions (A) and (C) are calculated by execution of the first operation in the supercritical fluid chromatograph 1, and the relational expression (B) is calculated by execution of the second operation in the supercritical fluid chromatograph 1. Further, the relational expressions (8) and (9) are automatically derived based on the relational expressions (A), (B) and (C). Therefore, it does not take user's time and labor to derive the relational expressions (8) and (9).

Further, the value of the sample introduction ratio R, the set value P[BPR1] of the pressure in the first BPR 161 and the set value P[BPR2] of the pressure in the second BPR 162 can be easily determined based on the relational expressions (8) and (9) between the sample introduction ratio R and the differential pressure (P[BPR2]−P[BPR1]) between the first and second BPRs 161, 162. Therefore, an analysis method can be easily created in regard to various samples.

(6) Other Embodiments (a) In a case where a makeup liquid is not used in the supercritical fluid chromatograph 1, the relational expression (C) does not have to be calculated. In this case, a makeup pressure ΔPmake-up is 0.

(b) A user may directly set part of values of a plurality of analysis conditions in a corresponding component of the supercritical fluid chromatograph 1.

(c) While the sample introducer 200 includes the supercritical fluid extractor 120 and the autosampler 130 in the above-mentioned embodiment, the sample introducer 200 may include one of the supercritical fluid extractor 120 and the autosampler 130.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the control instructor 303 is an example of an instructor, the sample introduction ratio calculator 305 and the differential pressure value calculator 309 are examples of a first calculator, the condition acquirer 301 is an example of a receiver, the pressure acquirer 304 is an example of an acquirer, the relational expression calculator 308 is an example of a second calculator, and the relational expression deriver 307 is an example of a deriver. Further, the relational expressions (8) and (9) are examples of a first relationship, the relational expression (A) is an example of a second relationship, the relational expression (B) is an example of a third relationship, and the relational expression (C) is an example of a fourth relationship. As each of constituent elements recited in the claims, various other elements having configurations or functions described in the claims can be also used.

We claim:

1. An analysis assistance device that assists determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, comprising:

a storage that stores a relationship between a sample introduction ratio representing a ratio of an amount of a sample to be introduced into the first flow path with respect to an amount of a sample to be introduced into the second flow path, and a differential pressure between the first and second back pressure regulators as a first relationship;

a receiver that receives one of a value of the sample introduction ratio and a value of the differential pressure;

a first calculator that calculates the sample introduction ratio or the differential pressure, whichever is not received by the receiver, from the one value received by the receiver based on the first relationship; and a presenter that presents the calculated value.

2. The analysis assistance device according to claim 1, further comprising:

an instructor that instructs the supercritical fluid chromatograph to set a pressure in the first back pressure regulator to a first set value and execute a first operation of supplying a mobile phase to the supply flow path at a first flow rate using the liquid sender with the second back pressure regulator closed, and instructs the supercritical fluid chromatograph to set a pressure in the second back pressure regulator to a second set value and execute a second operation of supplying a mobile phase to the supply flow path at a second flow rate using the liquid sender with the first back pressure regulator closed;

an acquirer that acquires a pressure in the supply flow path as a first pressure value during the first operation and acquires a pressure in the supply flow path as a second pressure value during the second operation;

a second calculator that calculates a relationship between a pressure applied to the analysis column and a flow rate in the analysis column as a second relationship based on the first flow rate, the first pressure value and the first set value, and calculates a relationship between a pressure applied to the second flow path and a flow rate in the second flow path as a third relationship based on the second flow rate, the second pressure value and the second set value; and a deriver that derives the first relationship based on the second relationship and the third relationship, wherein the storage stores the derived first relationship.

3. The analysis assistance device according to claim 2, wherein the instructor instructs the supercritical fluid chromatograph to supply a makeup liquid at a third flow rate to a position farther downstream than the analysis column in the first flow path during the first operation, the acquirer acquires a pressure that is increased in the supply flow path due to supply of the makeup liquid, the calculator calculates a relationship between an amount of increase in pressure caused by supply of the makeup liquid and a flow rate of the makeup liquid as a fourth relationship based on the increased pressure and the third flow rate, and the deriver derives the first relationship based on the second relationship, the third relationship and the fourth relationship.

4. An analysis assistance method of assisting determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, including:

storing a relationship between a sample introduction ratio representing a ratio of an amount of a sample to be introduced into the first flow path with respect to an amount of a sample to be introduced into the second flow path, and a differential pressure between the first and second back pressure regulators as a first relationship;

receiving one of a value of the sample introduction ratio and a value of the differential pressure;

calculating the sample introduction ratio or the differential pressure, whichever is not received, from the one received value based on the first relationship; and presenting the calculated value.

5. The analysis assistance method according to claim 4, further comprising:

instructing the supercritical fluid chromatograph to set a pressure in the first back pressure regulator to a first set value and execute a first operation of supplying a mobile phase to the supply flow path at a first flow rate using the liquid sender with the second back pressure regulator closed, and instructing the supercritical fluid chromatograph to set a pressure in the second back pressure regulator to a second set value and execute a second operation of supplying a mobile phase to the supply flow path at a second flow rate using the liquid sender with the first back pressure regulator closed;

acquiring a pressure in the supply flow path as a first pressure value during the first operation;

acquiring a pressure in the supply flow path as a second pressure value during the second operation;

calculating a relationship between a pressure applied to the analysis column and a flow rate in the analysis column as a second relationship based on the first flow rate, the first pressure value and the first set value;

calculating a relationship between a pressure applied to the second flow path and a flow rate in the second flow path as a third relationship based on the second flow rate, the second pressure value and the second set value; and deriving the first relationship based on the second relationship and the third relationship, wherein the storing includes storing the derived first relationship.

6. The analysis assistance method according to claim 5, further including:

instructing the supercritical fluid chromatograph to supply a makeup liquid at a third flow rate to a position farther downstream than the analysis column in the first flow path during the first operation;

acquiring a pressure that is increased in the supply flow path due to supply of the makeup liquid; and calculating a relationship between an amount of increase in pressure caused by supply of the makeup liquid and a flow rate of the makeup liquid as a fourth relationship based on the increased pressure and the third flow rate; and the deriving includes deriving the first relationship based on the second relationship, the third relationship and the fourth relationship.

7. A non-transitory computer readable medium storing an analysis assistance program that assists determination of an analysis condition of a supercritical fluid chromatograph including a liquid sender that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path, the analysis assistance program causes a computer to execute the processes of:

storing a relationship between a sample introduction ratio representing a ratio of an amount of a sample to be introduced into the first flow path with respect to an amount of a sample to be introduced into the second flow path, and a differential pressure between the first and second back pressure regulators as a first relationship;

receiving one of a value of the sample introduction ratio and a value of the differential pressure;

calculating the sample introduction ratio or the differential pressure, whichever is not received, from the one received value based on the first relationship; and presenting the calculated value.

8. An analysis system comprising:

a supercritical fluid chromatograph that includes a liquid supplier that supplies a mobile phase including a supercritical fluid to a supply flow path, first and second back pressure regulators that are respectively provided in first and second flow paths into which the supply flow path branches and an analysis column provided at a position farther upstream than the first back pressure regulator in the first flow path; and the analysis assistance device according to claim 1 that assists determination of an analysis condition of the supercritical fluid chromatograph.

* * * * *